Sept. 2, 1941.  H. W. KLEIST  2,254,225
REFRIGERATING APPARATUS
Filed June 10, 1939  4 Sheets-Sheet 2
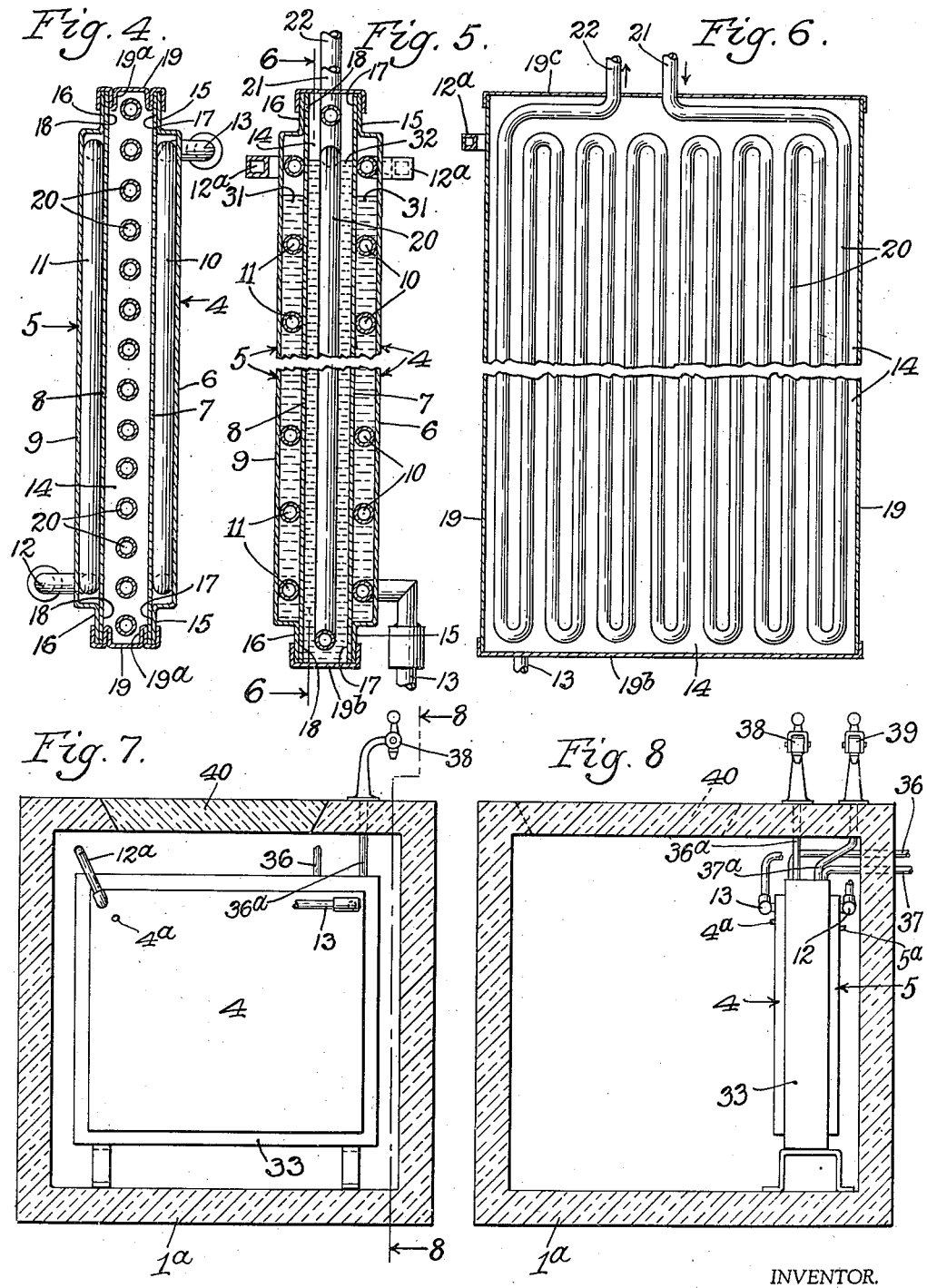
INVENTOR.
Herman W. Kleist
BY Parker & Carter
ATTORNEYS.

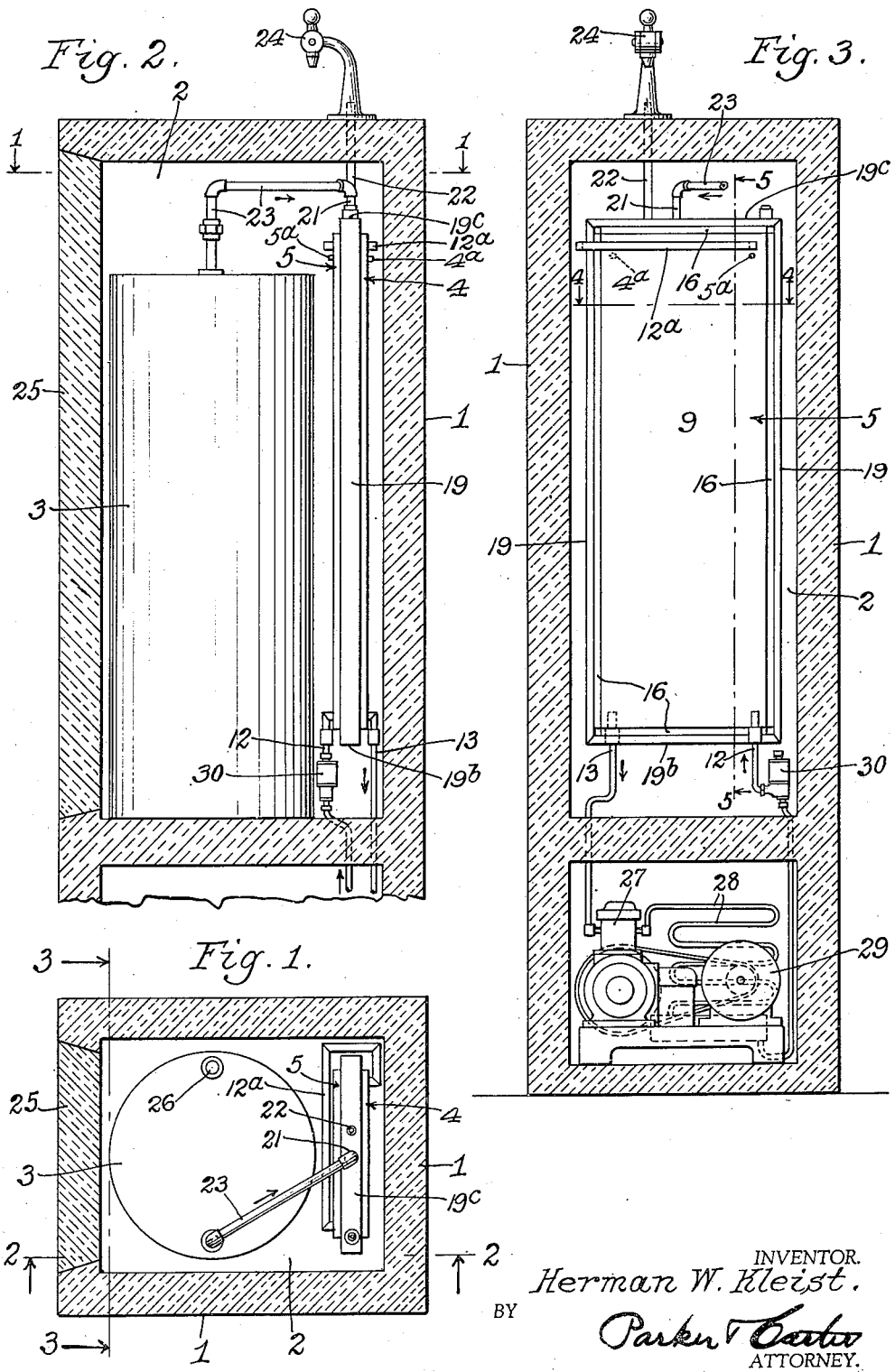

Sept. 2, 1941. H. W. KLEIST 2,254,225
REFRIGERATING APPARATUS
Filed June 10, 1939 4 Sheets-Sheet 3
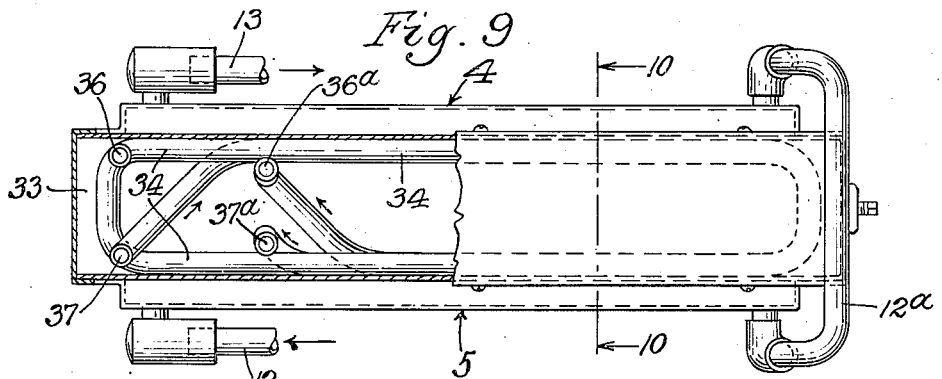
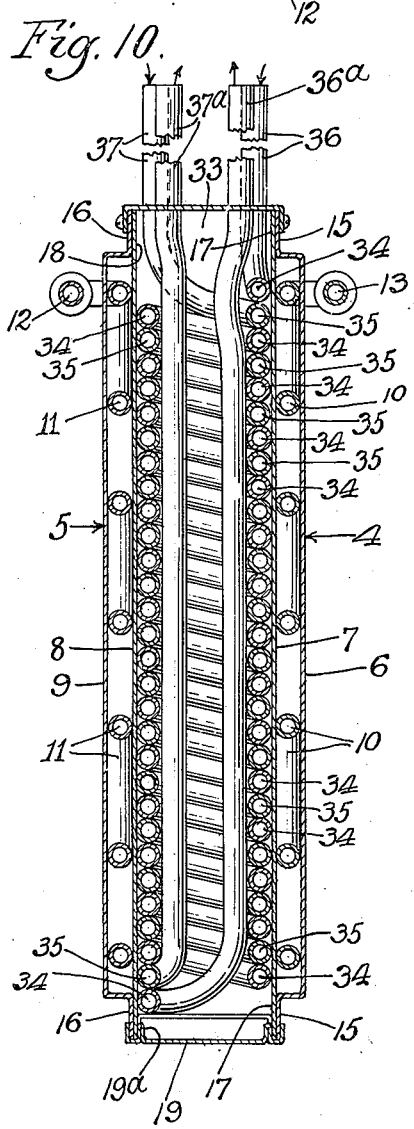
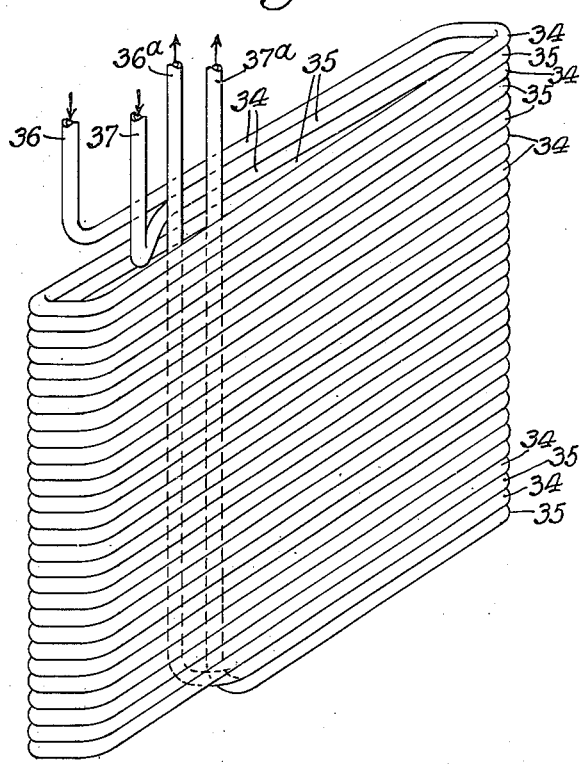
Inventor
Herman W. Kleist.
by Parker & Carter
Attorneys.

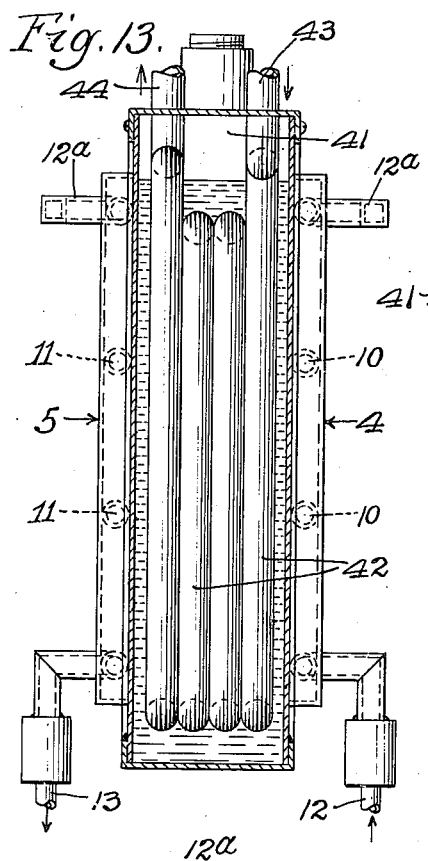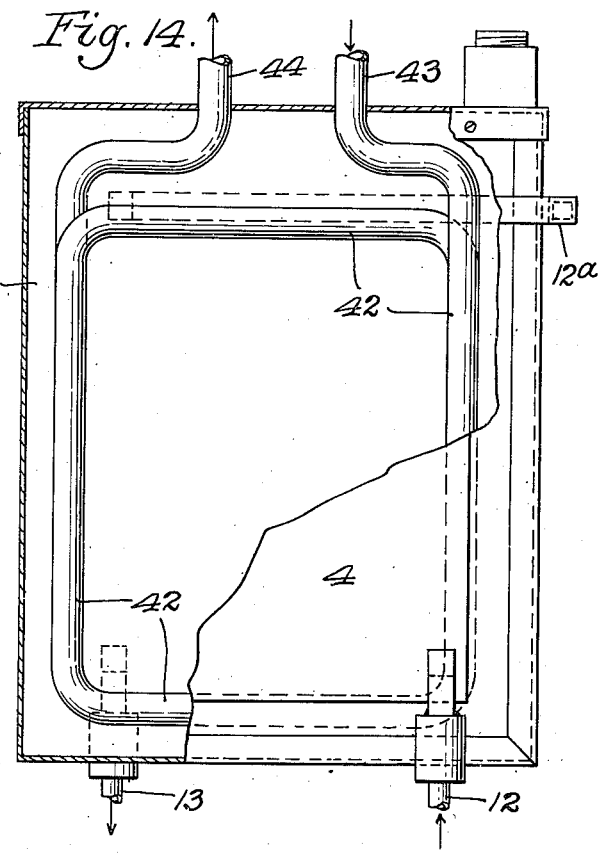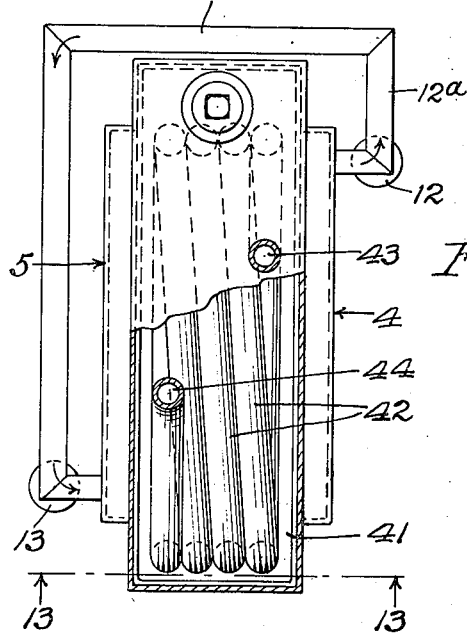

Patented Sept. 2, 1941

2,254,225

UNITED STATES PATENT OFFICE 2,254,225

REFRIGERATING APPARATUS

Herman W. Kleist, Chicago, Ill., assignor to Dole Refrigerating Company, Chicago, Ill., a corporation of Illinois Application June 10, 1939, Serial No. 278,419

12 Claims. (Cl. 62—99)

This invention relates to a refrigerating apparatus and has for its object to provide a new and improved device of this description.

The invention has a further object to provide a refrigerating apparatus having a refrigerating unit, which cools a beverage to be consumed and at the same time cooling a compartment for receiving material to be cooled. The invention has a further object to provide a refrigerating apparatus with a refrigerating unit which is used simultaneously to cool two separate beverages. The invention has as a further object to provide a refrigerating apparatus with a refrigerating unit which simultaneously cools two separate beverages and a compartment in which other material to be cooled is placed.

The invention has as a further object to provide a refrigerating apparatus having two cooling plates, with an intermediate receptacle containing a passageway through which a beverage to be cooled is passed. The invention has as a further object to provide a refrigerating apparatus having two cooling plates, with an intermediate receptacle containing one or more coils through which a beverage to be consumed is passed, the coils being in direct contact with the opposed faces of the plates. The invention has as a further object to provide a refrigerating apparatus having two cooling plates, with an intermediate receptacle containing a coil through which a beverage to be consumed is passed, the coil being in direct contact with the opposed faces of the plates, the intermediate receptacle being provided with a liquid in contact with the coil. The invention has as a further object to provide a refrigerating apparatus having two cooling plates with an intermediate receptacle containing a coil through which a beverage to be consumed is passed, the inner wall of the cooling plates forming the walls of the receptacle.

The invention has further objects which are more particularly pointed out in the accompanying description.

Referring now to the drawings,

Fig. 1 is a sectional view taken on line 1—1 of Fig. 2, showing one form of the device embodying the invention where the unit cools a beverage to be consumed and a compartment containing material to be cooled;

Fig. 2 is a sectional view taken on line 2—2 of Fig. 1;

Fig. 3 is a sectional view taken on line 3—3 of Fig. 1;

Fig. 4 is an enlarged sectional view taken on line 4—4 of Fig. 3;

Fig. 5 is a sectional view taken on line 5—5 of Fig. 3, with parts broken away;

Fig. 6 is a sectional view taken on line 6—6 of Fig. 5;

Fig. 7 is a vertical sectional view showing a refrigerating unit for cooling two beverages and for also cooling a cabinet for containing other material to be cooled and particularly adapted for use in connection with soda fountains;

Fig. 8 is a sectional view taken on line 8—8 of Fig. 7;

Fig. 9 is a plan view with the cover partly broken away, of the refrigerating units shown in Figs. 7 and 8;

Fig. 10 is a sectional view taken on line 10—10 of Fig. 9;

Fig. 11 is a perspective view, with parts broken away, of the coils shown in Figs. 9 and 10;

Fig. 12 is a top view showing a modified construction;

Fig. 13 is a sectional view taken on line 13—13 of Fig. 12; and

Fig. 14 is a side view of the device shown in Figs. 12 and 13, with parts broken away.

Like numerals refer to like parts throughout the several figures.

Referring now to Figs. 1 to 6 inclusive, I have shown a construction for cooling a liquid in a receptacle and for also cooling the liquid as it is drawn out of the receptacle, to be consumed. In this construction there is an insulating cabinet or box 1, provided with a space 2. In this space is located a container 3 for the liquid to be cooled.

Within the cabinet 1 is a cooling device consisting of two plates 4 and 5, each of which is made up of two sheets, the plate 4 being made up of the sheets 6 and 7 and the plate 5 being made up of the sheets 8 and 9. Located between the sheets 6 and 7 is a pipe 10 which extends back and forth between the sheets and through which a refrigerant material is passed. Located between the sheets 8 and 9 is a pipe 11 through which the refrigerant material is passed. The pipes 10 and 11 are preferably connected together, as by the pipe 12a, and the refrigerant material enters the pipe 11 through the inlet 12 and then passes into the pipe 10 and passes out the outlet 13. These plates 4 and 5 may be of any suitable form. When they are vacuum plates, the sheets from which they are made are hermetically sealed together and sufficient air is exhausted from between the plates to cause the sheets to tightly press against the pipes. The air is exhausted in any desired manner and through any desired agency, as, for example, by applying an air exhausting device to the air exhausting connections 4a and 5a.

In this construction the sheet 7 which forms one side of the plate 4 and the sheet 8 which forms one side of the plate 5, also form the walls of an intermediate receptacle 14. As herein shown, the sheet 6 is provided with a flange 15 extending therearound and the sheet 8 is provided with a flange 16 extending therearound. The sheet 7 is provided with the opposed part 17 which is opposed to the flange 15 and the sheet 8 is provided with the opposed part 18 which is opposed to the flange 16, and these parts are fastened together so as to be hermetically sealed to form the vacuum plates. The edges of the vacuum plates are connected together to form the receptacle 14 in any desired manner. As shown herein, they are connected together at their edges by the member 19, which is bent so as to overlap the parts 15 and 17 and 16 and 18, and provided with members 19a which hold the plates properly spaced to form the receptacle 14. At the bottom, the plates are held together by the member 19b and at the top, by the removable member 19c. These members are connected to the parts so as to form a leak proof receptacle 14.

Within the receptacle 14 is a pipe 20 which extends back and forth across the receptacle and which is provided with an inlet 21 and an outlet 22. The beverage or liquid to be cooled is passed through this pipe. In the particular construction shown, the inlet 21 is connected with the container 3 by the pipe 23. The outlet 22 is connected preferably with some means for drawing off the liquid, such as a draft arm or faucet 24.

The insulating cabinet or box 1 is provided with a door 25 by means of which access is secured thereto. If, for example, the container 3 contains beer or similar material, it will be provided with a pressure pump connection 26 by means of which air or carbonic acid gas or other material may be supplied. I have also shown the box or cabinet 1 as being supplied with refrigerating apparatus, including a compressor 27, a condenser 28 and a motor 29 for operating the compressor. When this device is used, there is an expansion valve 30 and the inlet 12 is connected with this expansion valve. The outlet 13 is connected with the compressor.

If desired, the plates 4 and 5 may be holdover plates and may be partially filled with a eutectic solution 31. I also prefer to provide the receptacle 14 with a eutectic liquid 32, such as water, which surrounds the pipe 20, see Fig. 5.

In Figs. 7 to 11 inclusive there is illustrated a modified form particularly adapted for use in connection with soda fountains. In this construction the two plates 4 and 5 as constructed in Figs. 4 and 5 are used and they are connected together in any desired manner, as in the manner shown in Figs. 4 and 5, and I have applied the same reference numerals to these plates and the parts thereof.

The receptacle 33 formed by the two plates 4 and 5 is larger and contains two separate pipes coiled back and forth, namely pipes 34 and 35. These pipes are preferably formed in alternate coils, as shown in Figs. 10 and 11, and the coils are preferably in contact with the sheets 7 and 8 of the plates 4 and 5. One of these pipes, as, for example, pipe 34, is connected to a water supply by the connection 36. The other pipe 35 is connected to a source of soda water by the connection 37. The other end 36a of the water pipe is connected to the draft arm or faucet 38 and the other end 37a of the soda water pipe is connected to the draft arm or faucet 39. It will be seen that by means of this device, there is supplied cold water and cold soda water from the same set of plates. These plates are located in the insulating cabinet or box 1a, which is provided with a door 40. This cabinet may be used for cooling any material, such as milk, cream, bottled goods, foods, or the like. This construction is particularly adapted to be used in drug stores or other places where beverages are dispensed and where it is also desirable to have cold water to supply to customers.

In Figs. 12 to 14 inclusive there is shown a modified construction particularly adapted for small installations. In this construction there are used the two plates 4 and 5 which are used to form the intermediate receptacle 41. In this construction the pipe 42 for the liquid to be cooled is formed in a series of rectangular shaped coils which are formed in the receptacle 41 and which are preferably surrounded by water. The liquid to be cooled enters at the inlet 43 and passes out at the outlet 44.

It will be noted that there is here provided a heat insulated cabinet for cooling articles placed therein, there being a cooling device in said cabinet for cooling the interior of the cabinet and also means associated with the cooling device for cooling a beverage from a source of supply outside of the cabinet. A dispensing device is located outside of the cabinet and there is means for delivering this beverage when cooled, to the dispensing device.

I claim:

1. A refrigerating apparatus comprising two plates, each consisting of two separated sheets connected together at their edges, one an outer sheet and one an inner sheet, and means for circulating a refrigerant material back and forth between the sheets of both plates, said plates being connected together to form an intermediate receptacle, the adjacent sheets of the plates forming walls for said receptacle, the outer sheets forming cooling surfaces for cooling material outside of the receptacle and the inner sheets forming cooling surfaces for cooling material in the interior of the receptacle.

2. A refrigerating apparatus comprising two plates, each consisting of two separated sheets connected together at their edges, means for circulating a refrigerant material back and forth between the sheets of both plates, said plates being connected together to form an intermediate receptacle, the adjacent sheets of the plates forming walls for said receptacle, and a pipe in said intermediate receptacle through which a beverage to be cooled is passed.

3. A refrigerating apparatus comprising two plates, each consisting of two separated sheets connected together at their edges, means for circulating a refrigerant material back and forth between the sheets of both plates, said plates being connected together to form an intermediate receptacle, the adjacent sheets of the plates forming walls for said receptacle, a pipe in said intermediate receptacle through which a beverage to be cooled is passed, and water in said receptacle in contact with said pipe.

4. A refrigerating apparatus comprising a plate having two separated sheets of metal connected together to form a hermetically sealed enclosure, a pipe extending back and forth between said sheets through which refrigerant material may be passed, a portion of the air being withdrawn from between said sheets to cause the sheets to tightly engage said pipe, means cooperating with one of said sheets to form a receptacle at one side of said plate and attached thereto and means for passing a beverage through said receptacle in proximity to said plate to cool said beverage.

5. A refrigerating apparatus comprising a plate having two separated sheets of metal connected together to form a hermetically sealed enclosure, a pipe extending back and forth between said sheets through which a refrigerant material may be passed, a portion of the air being withdrawn from between said sheets to cause the sheets to tightly engage said pipe, means cooperating with one of said sheets to form a receptacle at one side of said plate and attached thereto, two separate coils of pipe forming a unitary structure located in said receptacle and having at least portions in proximity to said plate and through which two different beverages may be simultaneously passed to be cooled by said plate.

6. A refrigerating apparatus comprising two plates, each consisting of two separated sheets connected together at their edges, means for circulating a refrigerant material back and forth between the sheets of both plates, said plates being connected together to form an intermediate receptacle, the adjacent sheets of the plates forming walls for said receptacle, a pipe in said receptacle through which a beverage to be cooled is passed, and an insulating cabinet containing said plates and receptacle, the plates in addition to cooling said beverage, acting to cool the interior of said cabinet.

7. A refrigerating apparatus comprising two plates, each made up of flat sheets, a pipe formed into coils located between the sheets of each plate, the plates being hermetically sealed and having air withdrawn therefrom to cause the plates to tightly engage the coils, said plates connected together with their adjacent sheets separated, so as to form a receptacle, and a pipe in said receptacle through which a beverage to be cooled is passed.

8. A refrigerating apparatus comprising two plates, each made up of flat sheets, a pipe formed into coils located between the sheets of each plate, the plates being hermetically sealed and having air withdrawn therefrom to cause the plates to tightly engage the coils, said plates connected together with their adjacent sheets separated, so as to form a receptacle, a pipe in said receptacle through which a beverage to be cooled is passed, and an insulating cabinet in which said plates are located, said plates acting to cool the interior of said cabinet, in addition to cooling said beverage.

9. A refrigerating apparatus comprising two plates, each made up of flat sheets, a pipe formed into coils located between the sheets of each plate, the plates being hermetically sealed and having air withdrawn therefrom to cause the plates to tightly engage the coils, said plates connected together with their adjacent sheets separated, so as to form a receptacle, and a pipe in said receptacle through which a beverage to be cooled is passed, said receptacle in which the pipe through which the beverage is passed, being partially filled with water.

10. A refrigerating apparatus comprising two plates, each made up of flat sheets, a pipe formed into coils located between the sheets of each plate, the plates being hermetically sealed and having air withdrawn therefrom to cause the plates to tightly engage the coils, a eutectic solution partially filling both of said plates, said plates connected together with their adjacent sheets separated, so as to form a receptacle, and a pipe in said receptacle through which a beverage to be cooled is passed.

11. A refrigerating apparatus comprising a heat insulated cabinet for cooling material placed therein, a beverage container within said cabinet, a cooling device in said cabinet for cooling the interior of the cabinet and the beverage in said container, said cooling device comprising two plates, each made up of flat sheets, a pipe formed into a coil located between the sheets of each plate, means for circulating a refrigerant material back and forth between the sheets of both plates, said plates being connected together to form an intermediate receptacle, the adjacent sheets of the plates forming walls for said receptacle, a pipe in said receptacle, a eutectic in said receptacle surrounding said pipe, a dispensing device with which one end of the pipe in said receptacle is connected, and a connection between said container and the other end of the pipe in said receptacle so that the beverage after being cooled in the container is passed through said pipe, to be further cooled as it is being dispensed to a user.

12. A refrigerating apparatus comprising a heat insulated cabinet for cooling material placed therein, a beverage container within said cabinet, a cooling device in said cabinet for cooling the interior of the cabinet and the beverage in said container, said cooling device comprising a plate made up of flat sheets, a pipe formed into a coil located between said sheets, a receptacle at one side of said cooling device, one of the sheets of the cooling device forming one side of said receptacle, a pipe formed into a coil in said receptacle, a eutectic in said receptacle in which said coil is immersed, a dispensing device on the outside of said cabinet, and means for delivering said beverage from said container and the coil in said receptacle to said dispensing device.

HERMAN W. KLEIST.